United States Patent [19]

Lefrancois

[11] 4,340,080
[45] Jul. 20, 1982

[54] INFLATION VALVE

[75] Inventor: Jean Lefrancois, Clermont-Ferran, France

[73] Assignee: Compagnie Generale des Etablissements Michelin, Clermont-Ferrand, France

[21] Appl. No.: 223,576

[22] Filed: Jan. 9, 1981

Related U.S. Application Data

[60] Division of Ser. No. 104,188, Dec. 17, 1979, abandoned, which is a continuation-in-part of Ser. No. 884,752, Mar. 9, 1978, abandoned.

[51] Int. Cl.$^3$ .............................................. F16K 15/20
[52] U.S. Cl. ................................. 137/223; 137/234.5; 137/533.21; 137/533.29
[58] Field of Search ..................... 137/223, 234.5, 533, 137/533.21, 533.29; 403/397

[56] References Cited

U.S. PATENT DOCUMENTS 2,862,515 12/1958 Briechle ............................ 137/234.5
3,213,500 10/1965 Thompson ............................ 403/397

FOREIGN PATENT DOCUMENTS 7703686 9/1977 France ............................. 137/234.5

Primary Examiner—Harold W. Weakley
Attorney, Agent, or Firm—Brumbaugh, Graves, Donohue & Raymond

[57] ABSTRACT

An inflation valve comprising an outer stem and an inner movable unit is improved by the inner movable unit being confined axially within the tubule by means of a plurality of axially rigid and radially deformable elastic parts in order to permit the installing and removal thereof.

1 Claim, 9 Drawing Figures

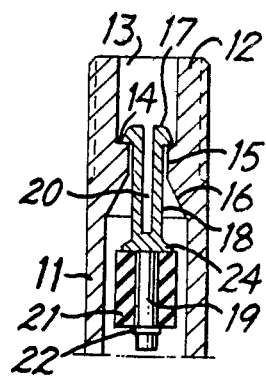
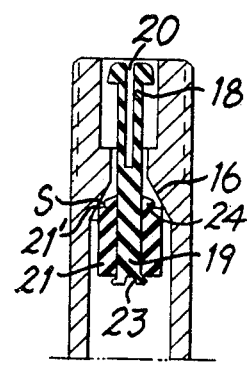
FIG. 1    FIG. 2
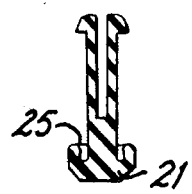
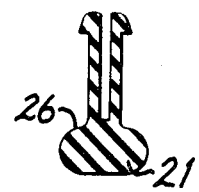
FIG. 3    FIG. 4
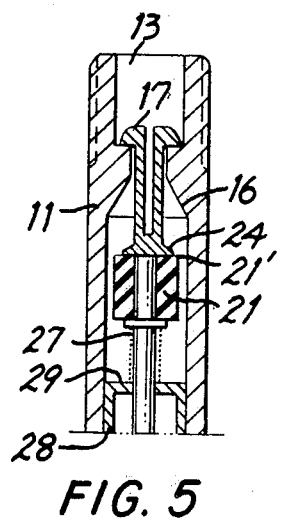
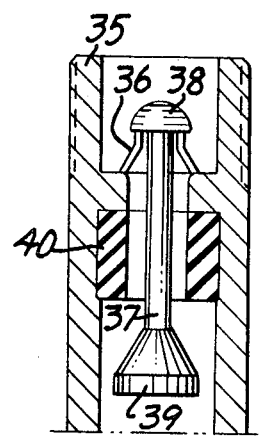
FIG. 5    FIG. 6

INFLATION VALVE

This is a division, of application Ser. No. 104,188, filed Dec. 17, 1979, which is a continuation-in-part application of U.S. application Ser. No. 884,752, filed Mar. 9, 1978 (both now abandoned).

The object of the present invention is an improved valve for inflatable objects and in particular for tires, whether or not provided with an inner tube; more particularly it relates to the construction of the valve interior.

It is known that a valve must perform various functions: an air seal between the inside of the object inflated and the atmosphere, the holding of the valve proper and the passage of the air or gas used during the inflating, deflating and pressure-testing operations. It is also known that in the case of tubeless tires it is necessary for the inflation to be effected with a greater flow of air which is greater than the leakage between the rim and beads of the tire in order that the latter can put themselves in position rapidly and then permit the internal pressure to increase.

The known valves generally comprise an outer tubule which is fastened hermetically to the object to be inflated, an inner part which assures air tightness, a movable unit comprising the valve proper and a guide rod, and a cap. Such an arrangement is described, for instance, in French Pat. No. 1,069,397.

These known valves have several drawbacks: their manufacture requires the production of numerous parts and then the assembling thereof, resulting in a relatively high total expense; furthermore, it is necessary to assure an air seal in two different zones, namely between the inner part and the valve body (tubule), on the one hand, and the valve proper on its seat, on the other hand; finally, the cross section for the passage of the air is small and if it is desired to obtain a substantial rate of air flow both upon inflation (particularly in the case of tubeless tires) and upon deflation, one is practically compelled to remove the valve interior.

The object of the present invention is specifically to overcome these drawbacks by providing a valve which is simpler and more economical than the known valves.

In accordance with the invention, an improved inflation valve comprising an outer tubule with a conical valve seat and a single inner movable unit, which unit includes a valve proper, a rod and a retaining head and is confined axially within the tubule, the valve proper having a conical stop for engagement of the conical stop and the valve proper with the conical valve seat when the inflation valve is in final valve-closed position, is characterized by the fact that the head of the inner movable unit or a zone of the tubule with which the head cooperates has a plurality of axially rigid and radially deformable elastic parts in order to permit the installing of the inner movable unit within the tubule and eventually the removal of the inner movable unit from the tubule.

The axially rigid and radially deformable elastic parts may be integral either with the retaining head of the movable unit or with the zone of the tubule with which the head cooperates.

In a preferred embodiment of the invention, the valve is characterized by the fact that the axially rigid and radially deformable elastic parts are formed of a plurality of elements which are capable of moving aside for the installing of the movable unit and of resuming their initial position, confining the movable unit in the axial direction between two invariable positions fixed, on the one hand, by the elements which are axially rigid and, on the other hand, by a stop provided on the valve proper.

The axially rigid and radially deformable elastic parts may be formed either of a plurality of tongues integral with the retaining head of the inner movable unit or of a plurality of tongues integral with the tubule along the rod of the inner movable unit, or else by split elastic rings removably mounted in a circular groove in the head, or else by other variant embodiments.

Various embodiments of the invention will now be described, by way of illustration and not of limitation, with reference to the accompanying drawing in which:

FIG. 1 is a longitudinally sectional view of a valve in accordance with the invention, shown in its valve-open position;

FIG. 2 is a longitudinal sectional view of a variant of said valve, shown in its initial valve-closed position;

FIGS. 3 and 4 are schematic longitudinal sectional views of two variants of the valve proper;

FIG. 5 is a longitudinal sectional view of a valve equipped with a return spring;

FIG. 6 is a longitudinal sectional view of a variant embodiment of a valve in accordance with the invention in which the axially rigid and radially deformable elastic parts are located on the tubule;

The corresponding parts of these different figures bear the same reference numerals.

Figure 7:
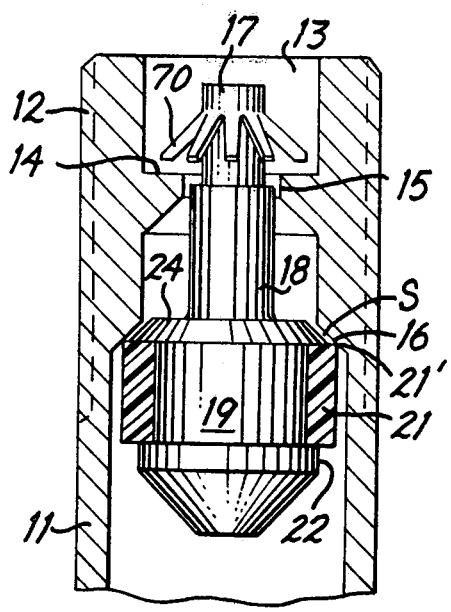
FIGS. 7 to 9 are longitudinal sectional views of valves in accordance with the invention, shown in initial valve-closed position.

The valve shown in FIG. 1 comprises, in manner known per se, an outer tubule 11 which is externally threaded at its end or nose 12 in order to receive a cap (not shown) and containing on its inside a recess 13, a stop 14, a guide hole 15 and a conical valve seat 16. The inner movable unit of this valve comprises a retaining head 17, a rod 18 and a gasket-bearing shank 19. The head 17 and rod 18, both made of an elastic material (metal or plastic), have slits 20. These slits 20 fulfill two functions: they assure the passage of air and they permit the head 17 and the upper portion of the rod 18 to contract radially and the head 17 to pass upwardly through the guide hole 15 upon the installing of the movable unit within the tubule 11; thereupon the head 17 and the rod 18 expand radially and resume their normal position of equilibrium, which enables the head 17 to rest against the stop 14 when the valve is in open position. The number of slits 20 is not critical, but advantageously there may be at least two (crosswise, for instance) or three to give the deformable parts of the head 17 and the rod 18 a better transverse or radial elasticity. The shank 19 bears the gasket 21 which is the valve proper. The fastening of the gasket 21 onto the shank 19 is assured by a conical stop 24 and a split ring 22 or by simple pinching. The stroke of the inner movable unit within the tubule 11 is limited axially in one direction by contact between the head 17 and the stop 14 and in the other direction by contact of the conical stop 24 and the valve proper or gasket 21 with the conical valve seat 16.

FIG. 2 shows a similar valve in initial valveclosed position, the valve proper or gasket 21 being fastened onto the shank 19 between a flaring 23 and a conical stop 24. In order to avoid the use of a removable gasket, the valve proper 21 may be of different shapes, for instance in the shape of a deformable lip 25 (FIG. 3) or in a bulbous shape 26 (FIG. 4) the air tightness of which is assured along a circular line.

It is in all cases possible to equip the valve with a return spring, as known per se; as can be noted from FIG. 5, this return spring 27 rests against a cup 28 which is forcefitted in the tubule 11 and provided with holes 29 for the passage of air. This variant may be advantageous when the valve is intended to be fastened to an inner tube which it is desired to store in flattened shape.

Such a return spring device may also be provided between the bottom of the head 17 and the stop 14.

Referring to FIG. 6, there will now be described a variant embodiment of the valve in which the radially deformable elastic parts are present on the tubule.

The outer tubule 35 has axially rigid and radially deformable elastic parts which may consist, for instance, of notched lips 36.

The inner movable unit comprises three parts: a cylindrical rod 37, a head 38 which can push the lips 36 apart upon installation and then come into abutment against the lips 36 upon inflation and a valve proper or shank 39 whose conical shape makes it possible to form an airtight seal on a cylindrical (or conical) gasket or valve seat 40 of rubber mounted in the tubule 35.

The valve in initial valve-closed position shown in FIG. 7 comprises, in manner known per se, a tubule 11 externally threaded at its end or nose 12 to receive a cap (not shown) and provided on its inside with a recess 13, a circular stop 14, a guide hole 15 and a conical valve seat 16. The inner movable unit comprises a head 17, a rod 18, and a gasket-bearing shank 19. The latter comprises, in succession, a conical stop 24, a gasket 21 which is the valve proper and a stop 22 to retain the gasket 21 on the shank 19. The head 17 has radially deformable elastic parts, such as tongues 70, which are axially rigid.

In accordance with the invention, the inner movable unit is confined axially within the tubule 11 between two invariable positions fixed, on the one hand, by the resting of the tongues 70 against the stop 14 and, on the other hand, by the resting of the conical stop 24 and the valve proper or gasket 21 against the conical valve seat 16. These two positions are determined in such a manner that, on the one hand, the position of the head 17 with respect to the valve end 12 permits inflation with customary commercial apparatus and, on the other hand, that the compressing of the gasket 21 can assure the air tightness of the valve.

Figure 8:
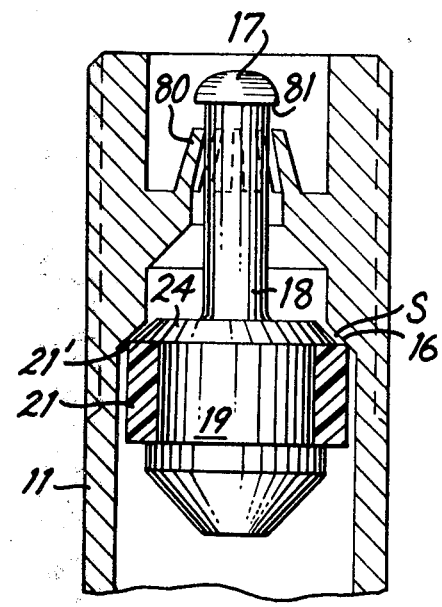

FIG. 8 shows a valve in initial valve-closed position whose tubule 11 has radially deformable elastic parts, such as tongues 30, which are axially rigid, while the head 17 has a circular stop 81. It can be seen that in this way, in accordance with the invention, the inner movable unit is confined axially between two invariable positions fixed, on the one hand, by the resting of the stop 81 of the head 17 against the tongues 80 and, on the other hand, by the resting of the conical stop 24 and the gasket 21 or valve proper against the conical valve seat 16.

Figure 9:
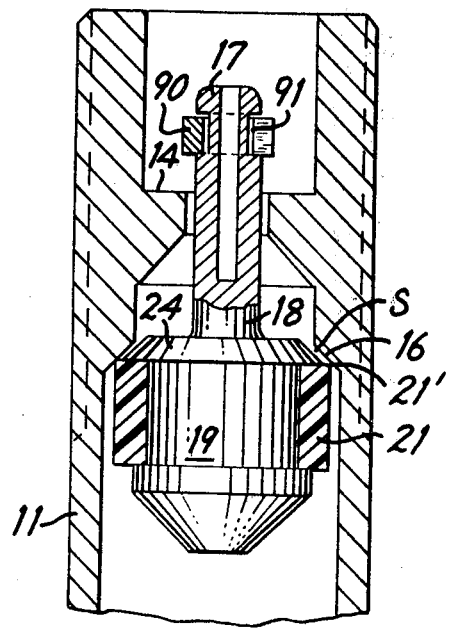

FIG. 9 shows a valve in initial valve-closed position in which the axially rigid and radially deformable elastic parts are formed of split elastic rings 90 (of the "circlip" type) removably mounted in a circular groove 91 in the head 17. In accordance with the invention, the inner movable unit is confined axially within the tubule 11 between the two invariable positions, fixed, on the one hand, by the resting of the rings 90 against the stop 14 and, on the other hand, by the resting of the conical stop 24 and the valve proper or gasket 21 against the conical valve seat 16.

It can be noted that the valve of the invention, several embodiments of which have just been described, fulfills all the functions of the valves of known type, namely air tightness, retaining of the valve proper, the passage of air upon inflation, deflation and the testing of the air pressure, and that furthermore it is perfectly compatible with the various accessories currently used (inflation pumps, pressure gauges, etc.) so that it can receive the different types of caps presently on the market.

Purely by way of illustration, the inflation and deflation times obtained in preliminary experiments on a tire having a capacity of 26 liters are indicated below.

|  | Known Valve | | Valve in |
| --- | --- | --- | --- |
|  | Interior Mounted Time (seconds) | Interior Removed Time (seconds) | accordance with the Invention Time (seconds) |
| Inflation from 0 to 3.5 bar | 24 | 16 | 18 |
| Deflation from 3.5 to 0.1 bar | 84 | 36 | 48 |

It can be seen that the valve in accordance with the invention makes it possible, without any manipulation, to obtain inflation and deflation times comparable to those of the known valves whose interior has been removed; since it is obviously obligatory then to reinstall this interior, the saving in time for a complete inflating or deflating operation (from the unscrewing of the cap until its rescrewing) is therefore appreciable. However, and this is much more important, the obtaining of high rates of air flow makes it possible, without removing the valve interior, to effect the putting in place of the tire beads and the inflating of tubeless tires, which operation is at the present time carried out in two steps.

Furthermore, this valve is very economical, since its interior, which is of simple shape, and its tubule can be produced by either molding or machining (from metal, plastic, elastomer, etc.) and no longer obligatorily by machining; finally, the extremely easy installation can be carried out automatically and very rapidly.

It will be noted that in the valve of the invention there is only a single air sealing zone to be respected, namely between the valve proper and its seat. Moreover, the cross section of passage of the air in certain embodiments of the valve is considerably increased by the presence of slits 20 in the head 17 and in the rod 18, their shape, their number, their dimensions, their position, etc.

In the initial valve-closed position (shown in FIGS. 2 and 7-9) the upper edge 21' of the valve proper or gasket 21 rests against the conical valve seat 16 leaving a space S between the conical stop 24 and the conical valve seat 16. However, in the final valve-closed position (not shown) the outward pressure of the inflation air within the tire cavity causes the upper edge 21' of the valve proper or gasket 21 to deform against the conical valve seat 16 so that both the valve proper or gasket 21 and the conical stop 24 engage or rest against the conical valve seat 16.

The valve proper or gasket 21 can be made, e.g., of rubber (as shown by the cross-hatching symbol used in FIGS. 1-5) or of synthetic resin or plastic (as shown by the crosshatching symbol used in FGS. 7-9) or of any other suitable deformable material which insures an air-tight seal.

What is claimed is:

1. An inflation valve comprising an outer tubule with a conical valve seat and a single inner movable unit, which unit includes a valve proper, a rod and a retaining head and is confined axially within the tubule, the valve proper having a conical stop for engagement of the conical stop and the valve proper with the conical valve seat when the inflation valve is in final valve-closed position, said valve being characterized by the fact that the head of the inner movable unit has a plurality of axially rigid and radially deformable elastic tongues which are integral with said retaining head and which are oriented in a conical pattern coaxial with the valve and open toward the valve seat.

* * * * *

UNITED STATES PATENT AND TRADEMARK OFFICE
CERTIFICATE OF CORRECTION

PATENT NO. : 4,340,080
DATED : July 20, 1982
INVENTOR(S) : Jean Lefrancois

It is certified that error appears in the above—identified patent and that said Letters Patent is hereby corrected as shown below:

First page, Item 75, "Clermont-Ferran" should read --Clermont-Ferrand--;

First page, first col., following Item 60, insert:

--[30]  Foreign Application Priority Data
  Mar. 11, 1977   France   77/07,578
  Feb.  8, 1978   France   78/03,740--.

Col. 2, line 16, "longitudinally" should read --longitudinal--;
        line 63, "valveclosed" should read --valve-closed--.
Col. 3, line 52, "30" should read --80--.

Signed and Sealed this

Twelfth Day of October 1982

[SEAL]

Attest:

GERALD J. MOSSINGHOFF

Attesting Officer   Commissioner of Patents and Trademarks